United States Patent
Loukas et al.

(10) Patent No.: US 6,746,644 B2
(45) Date of Patent: Jun. 8, 2004

(54) PROCESS AND APPARATUS FOR CURING RESIN-BONDED REFRACTORY BRICK LINED LADLES

(75) Inventors: Paul W. Loukas, North York (CA); Manfred Sallaberger, North York (CA)

(73) Assignee: Advanced Combustion Inc., Ontario (CA)

(*) Notice: Subject to any disclaimer, the term of this patent is extended or adjusted under 35 U.S.C. 154(b) by 109 days.

(21) Appl. No.: 10/147,825

(22) Filed: May 20, 2002

(65) Prior Publication Data

US 2003/0060354 A1 Mar. 27, 2003

(30) Foreign Application Priority Data

Sep. 21, 2001 (CA) .............................................. 2357626

(51) Int. Cl.⁷ .............................................. C21B 13/00
(52) U.S. Cl. .......................... 266/44; 266/281; 264/30; 432/9
(58) Field of Search ................ 266/280, 281, 266/286, 144, 156, 159, 44; 501/99; 264/30; 432/9

(56) References Cited

U.S. PATENT DOCUMENTS

| | | | | |
|---|---|---|---|---|
| 4,364,729 A | * | 12/1982 | Fresch | 432/9 |
| 4,432,726 A | * | 2/1984 | Gitman | 432/9 |
| 4,457,706 A | * | 7/1984 | Finke et al. | 432/226 |
| 4,646,660 A | * | 3/1987 | Bjorkman et al. | 110/210 |
| 2003/0060354 A1 | * | 3/2003 | Loukas et al. | 501/99 |

FOREIGN PATENT DOCUMENTS

| | | |
|---|---|---|
| CA | 2021960 | 2/1991 |
| DE | 2841469 A | * 4/1979 |

* cited by examiner

Primary Examiner—Scott Kastler
(74) Attorney, Agent, or Firm—Jeffrey S. Melcher; Manelli Denison & Selter, PLLC

(57) ABSTRACT

An improved process of curing resin-bonded refractory brick lining of a ladle within a housing by heating the brick in air at an effective temperature to produce resin vapors and transferring the vapors from the ladle comprising transferring the vapors at a temperature above the condensation temperature of the transferred vapors to an auxiliary burner to effect combustion of the transferred vapors to produce non-toxic gases. The process provides an efficacious and environmentally sound treatment of resin-bonded refractory bricks.

10 Claims, 2 Drawing Sheets

PROCESS AND APPARATUS FOR CURING RESIN-BONDED REFRACTORY BRICK LINED LADLES

FIELD OF THE INVENTION

This invention relates to a process for curing resin-bonded refractory brick lined ladles, and apparatus therefore.

BACKGROUND TO THE INVENTION

Traditionally, the refractory brick used to line ladles of use in EAF (electric arc furnace) operations was a pre-fired high alumina type brick, which had the tendency to be attacked by the chemically alkaline EAF slag and molten metal in the ladle. Thus, the life of the brick was short and, in consequence, had to be replaced, often, at high expense in time, effort and cost.

The aforesaid alumina brick has since been replaced by an organic resin-bonded brick, which is cheaper than the alumina brick, is more resistant to chemical attack by EAF slag and molten metal and, thus, lasts longer. It is also more readily available on demand to eliminate the need to stock the brick in inventory.

Unfortunately, the resin-bonded brick requires a longer dry-out period, and, in such drying process, smelly fumes of toxic organic chemicals, such as, benzene, phenol, formaldehyde, other hydrocarbons and carbon deposits are produced, which create an unpleasant and environmentally unsafe atmosphere. Complaints such as nausea, headache and eye and throat irritation are merely noticeable manifestations of the dangers. Since in a typical 150 tonne (150,000 kg) ladle, the refractory lining could contain in excess of 90 kgs of organic compounds, a process is required to address the curing treatment of the resin-bonded brick to prevent the aforesaid disadvantages.

However, the apparatus and process recently introduced to eliminate the toxic compounds in the emissions has been shown to be ineffective by reasons of being unreliable, inefficient and requires significant maintenance. Specifically, cooling of the organic fumes causes condensation and solidification onto equipment, such as, blowers, valves, pipes and the like which, over time, become plugged and inoperative.

There is, therefore, a need for apparatus and process for the removal of the toxic organic fumes produced by the drying process of resin-bonded refractory bricks which does not create an environmentally unsafe atmosphere or cause plugging and unwanted deposition of condensed fumes.

SUMMARY OF THE INVENTION

It is an object of the present invention to provide a process for the drying of resin-bonded refractory bricks which does not create an environmentally unsafe environment for process workers or plugging of process equipment.

It is a further object to provide apparatus for use in the aforesaid process.

Accordingly, in one aspect the invention provides an improved process of curing resin-bonded refractory brick lining of a ladle within a housing, by heating said brick in air at an effective temperature to produce resin vapors and transferring said vapors from said lining, the improvement comprising transferring said vapors at a temperature above the condensation temperature of said transferred vapors to an auxiliary burner to effect combustion of said transferred vapors to produce non-toxic gases.

In preferred embodiments, the process is as hereinabove defined wherein the vapors are produced, transferred and combusted at a negative pressure differential within the housing relative to outside of the housing as to reduce unwanted vapor leakage from the housing.

In more preferred practical embodiments, the vapors are produced, transferred and combusted at a pressure of less than atmospheric.

In a preferred aspect, the invention provides an improved process of curing resin-bonded refractory brick lining of a ladle within a housing by heating said brick in air at an effective temperature to produce resin vapors and transferring said vapors from said ladle; the improvement comprising (i) transferring said vapors to an auxiliary burner to affect combustion of said transferred vapors to produce non-toxic gases;

(ii) drawing said transferred vapors to said auxiliary burner under suction by suction means to create a negative pressure differential value of said transferred vapor relative to atmospheric;

(iii) measuring the pressure differential value of said transferred vapors relative to atmospheric;

(iv) feeding said pressure differential value to central processing means;

(v) controlling by said central processing means said suction means to control the pressure differential value of said vapors at a desired negative value;

(vi) measuring the temperature value of said transferred vapors;

(vii) feeding said temperature value to said central processing unit; and (viii) controlling by said central processing means the amount of air to said ladle to maintain said transferred vapors above the condensation temperature of said vapors.

In a further aspect, the invention provides apparatus for the curing of resin-bonded refractory brick lining of a ladle within a housing, comprising means for heating said brick in feed air at an effective temperature to produce resin vapors and means for transferring said vapors as transferred vapors from said ladle, the improvement comprising means for maintaining said transferred vapors above the condensation temperature of said vapors, auxiliary burner means for burning said transferred vapors to produce non-toxic gases therefrom; and means for transferring said transferred vapors to said auxiliary burner means.

In a preferred further aspect, the invention provides apparatus for the curing of resin-bonded refractory brick lining of a ladle within a housing, comprising means for heating said brick in air at an effective temperature to produce resin vapors and means for transferring said vapors as transferred vapors from said ladle; the improvement comprising (a) an auxiliary burner to affect combustion of said transferred vapors to produce non-toxic gases;

(b) suction fan means for transferring said transferred gases to said auxiliary burner under a desired negative pressure differential value relative to atmospheric;

(c) pressure measuring means for determining said pressure differential value;

(d) temperature measuring means for determining the temperature of said transferred vapors;

(e) air inlet means for providing air to said housing; and (f) central processing means in communication with said suction means, said air inlet means, said temperature sensing means and said pressure measuring means and for controlling said suction means and said air inlet means for maintaining said desired negative pressure differential value and said temperature of said transferred vapors above the condensation temperature of said vapors.

The preferred process and apparatus according to the invention comprises a fossil fuel combustion burner.

Thus, it has been found that suitable measurement, inter-related manipulation and subsequent resultant control of the process parameters, such as temperature, pressure and air flow rates provides for an efficacious and environmentally sound resin curing process.

BRIEF DESCRIPTION OF THE DRAWINGS

In order that the invention may be better understood, a preferred embodiment will now be described by way of example only with reference to the accompanying drawings, wherein.

DETAILED DESCRIPTION OF A PREFERRED EMBODIMENT

Figure 1:
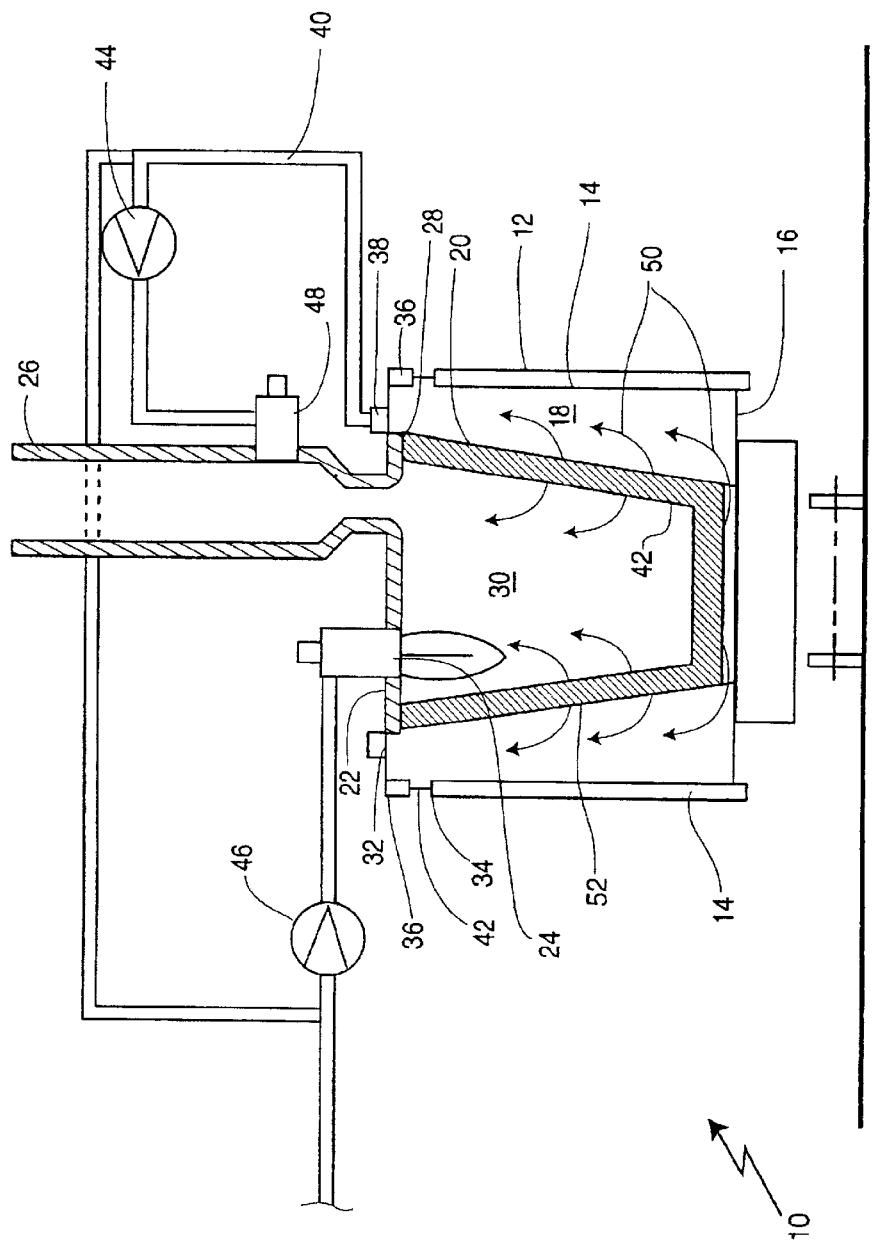
FIG. 1 is a diagrammatic, vertical sectional sketch of a resin-bonded refractory brick-lined ladle curing apparatus according to the prior art.

With reference to FIG. 1, this shows prior art apparatus generally as 10 comprising a right vertical cylindrical housing 12 having vertical walls 14 and open bottom 16 which define a ladle receiving chamber 18 enclosing a resin-bonded brick-lined ladle 20. At the top of housing 12 is a cover 22 having a downwardly directed burner 24 and upstanding chimney 26 and resting upon ladle 20 through seal 28 to provide an enclosed ladle chamber 30 in gaseous communication with chimney 26.

Extending from the periphery 32 of cover 22 to the circumferential top edge 34 of housing 12 is a circumferential seal 36 having an extraneous vapor outlet 38 of a conduit 40. Conduit 40 leads to an incinerator blower 44 and a ladle burner blower 46. Incinerator blower 44 blows a portion of extraneous vapor to incinerator burner 48 within chimney 26 and the remaining portion of the extraneous vapor to burner 24.

In operation, vapor emissions from the inner surface 42 of ladle chamber 30 are drawn up chimney 26 by the draught created by incinerator burner 48. Extraneous vapor emissions 50 emanating from the outer surface 52 of ladle 20 are drawn up through outlet 38.

However, in practice, seals 28 tend not to be reliable and often fail. Further, ambient air enters housing chamber 18 through base 16 to affect the ladle dry-out temperature and effect unwanted cooling of the vapor to below the typical condensation temperature of about 250° C., and cause condensation of the vapor to plug air blowers, valves in conduits and the like (not shown).

Thus, the aforesaid curing apparatus generally has no air inlet controller to housing chamber 18 other than in association with ladle burner 24, or means for controlling the temperature of the emitted vapors to prevent condensation. Further, there is no provision for the extraneous vapor to remain above its condensation temperature.

Although extraneous vapor around the outside of the ladle within the enclosure is drawn under suction by fan 44 out of the enclosure, negative pressure is not involved because of the air drawn into the enclosure through open bottom 16 of the apparatus.

Figure 2:
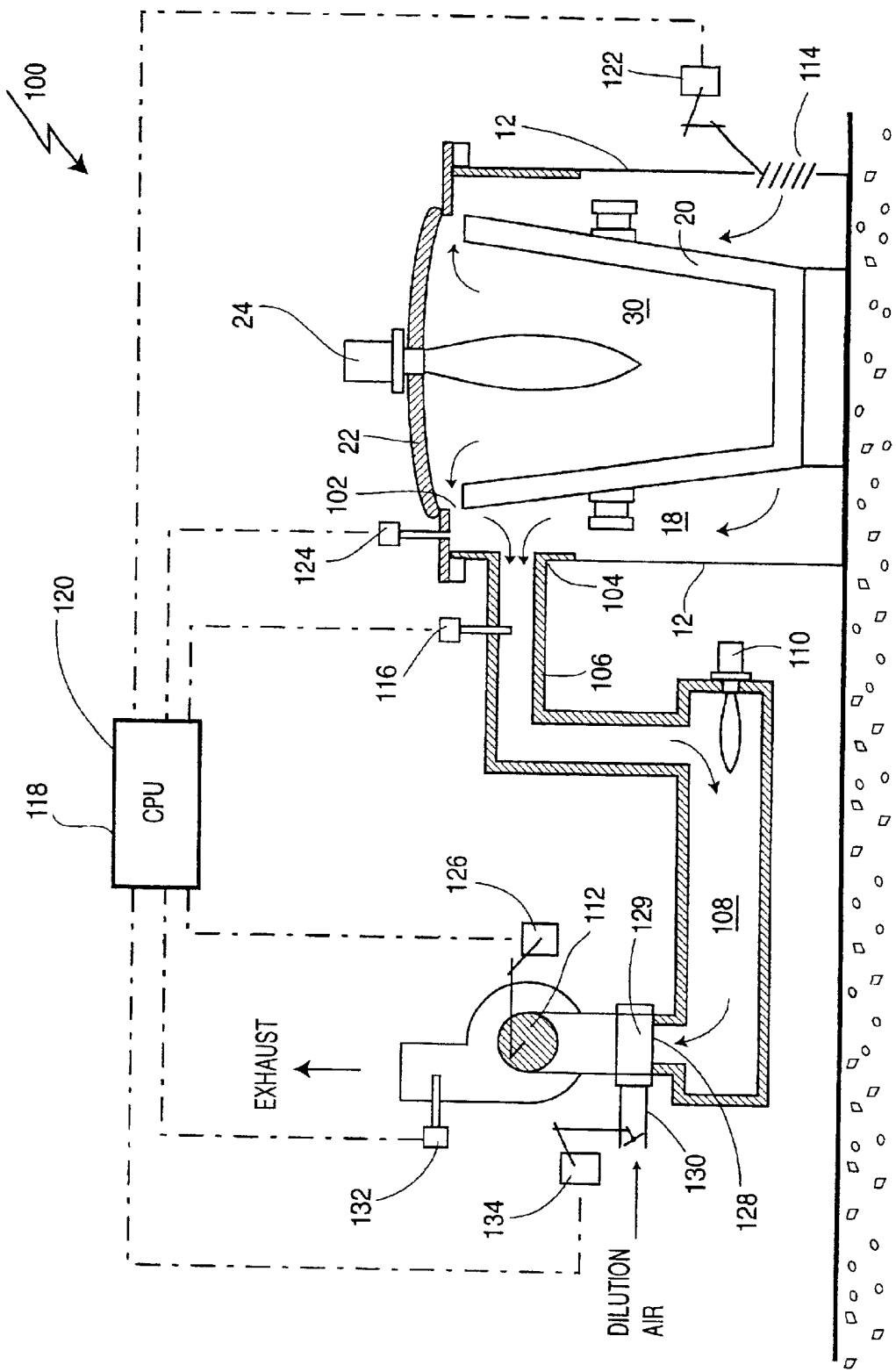
FIG. 2 is a diagrammatic, vertical sectional sketch of a resin-bonded refractory brick-lined ladle curing apparatus according to the invention; and wherein the same numerals denote like parts.

With reference to FIG. 2, this shows ladle 20 within chamber 18 with burner 24 directed downwards. Burner 24 is retained within housing cover 22 to form an airtight seal with the housing walls while not having prior art upwardly directed chimney 26. Cover 22 does not contact the top of ladle 20 but allows of a circumferential waste gases passage 102 along the rim of ladle 20, connecting with chamber 18. However, housing wall 12 at an upper part 104 connects with a resin vapor conduit 106, leading to a fume incinerator chamber 108 containing a supplementary auxiliary burner 110. Waste gases are drawn through chamber 108 by draft fan 112. The waste gas fumes are heated to a temperature by burner 110 to initiate and sustain combustion of the resin vapors. Chamber 108 is of a sufficient size as to allow sufficient residence time of the gases to complete total combustion of the resin vapors contained in the waste gases.

Housing 12 at a lower part diagonally opposed from conduit 106 has a controlled air intake 114.

Conduit 106 has a temperature probe 116 linked to temperature control means 118 within central processing unit (CPU) 120, which in turn cooperates with a motorized actuator 122 to adjust variable area air inlets 114.

The pressure inside enclosure 18 and associated passages is sensed by a differential pressure detector 124 relative to the atmospheric pressure outside housing 12. Detector 124 is linked to pressure control means within CPU 120 which, thus, also regulates the adjustable inlet louvers of exhaust fan 112 through a motorized actuator 126 to maintain the desired pressure within enclosure 18 below atmospheric pressure to prevent any resin vapors from escaping into the atmosphere.

The exhaust gases of chamber 108 are drawn by fan 112 through conduit 128 along with dilution ambient temperature atmospheric air inducted through a variable area air inlet 129 of a conduit 130. The amount of dilution air required is determined by the desired safe temperature of the exhaust gases released to atmosphere. A temperature probe 132 is located at the discharge side of fan 112 and is linked to temperature control means within CPU 124 which controls air entering inlet 128 of conduit 130 ahead of fan 112 through a motorized actuator 134.

In operation, burner 24 heats resin-bonded lining ladle 20 to produce waste gases within ladle 20 and which exit through passage 102. The waste gases mix with air and any extraneous vapor around the outside of ladle 20 and drawn through conduit 106 by fan 112 to incinerator 108 and destroyed by burner 110.

Atmospheric air is allowed to be drawn into enclosure 18 through inlet 114 to provide the combustion air for the resin vapors. The volume of atmospheric air allowed to enter through inlet 114 is controlled and limited by the temperature of the waste gas/resin vapor/atmospheric air mixture leaving enclosure 18 and entering conduit 106. The mixture temperature is maintained above the condensation temperature of the resin vapors to prevent clogging of conduit 106 and associated components, such as temperature probe 116 and pressure probe 124.

The apparatus of the present invention also has provision for associating a pressure sensor to influence control means 120 for also controlling the volume of air drawn into the system through inlet 114 to purposely maintain a negative pressure, i.e. below atmospheric pressure.

Typical operating parameters for a process and apparatus described with reference to FIG. 2 are as follows.

The temperatures within the apparatus are of the order of 350° C. exiting the housing into conduit 106 as measured by temperature probe 116; about 760° C. incinerator temperature within chamber 108; and about 200° C. exhaust gas temperature as measured by probe 132.

A typical negative pressure differential within housing 12 is of the order of −0.20″ W.C.

Typical flow rates for the gases are of the order of 1700 SCFM for each of the combustion products of the dryer burner and of the resin fumes and air; dilution air of about 8500 SCFM; and about 1000 SCFM for the incinerator combustion products.

Thus, manipulation of the air intake volumes, suction fan rates, burning rates and the like in consequence of the temperature and differential pressure values desired, by means of a suitably algorithmically controlled CPU enables the objects of the present invention to be efficaciously attained.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. In an improved process of curing the resin-bonded refractory brick lining of a ladle within a housing by heating said brick in air at an effective temperature to produce resin vapors and transferring said vapors from said ladle, the improvement comprising transferring said vapors at a temperature above the condensation temperature of said transferred vapors to an auxiliary burner to effect combustion of said transferred vapors to produce non-toxic gases; wherein said vapors are produced, transferred and combusted at a negative pressure differential within said housing relative to outside of said housing so as to reduce unwanted vapor leakage from said housing.

2. A process as defined in claim 1 wherein said vapors are produced, transferred and combusted at a pressure of less than atmospheric.

3. A process as defined in claim 1 wherein said ladle has inner ladle surfaces from which inner surface vapors emanate and outer ladle surfaces from which outer surface vapors emanate and wherein each of said inner and outer surface vapors are transferred to said auxiliary burner.

4. A process as defined in claim 1 further comprising measuring the temperature of said transferred vapors and controlling the amount of air to said ladle to maintain said transferred resin vapors above said condensation temperature.

5. A process as defined in claim 1 further comprising drawing said transferred vapors to said auxiliary burner under suction.

6. A process as defined in claim 1 comprising transferring said vapors to said auxiliary burner prior to any contacting of said vapors with fan means or valve means.

7. In an improved process of curing the resin-bonded refractory brick lining of a ladle within a housing by heating said brick in an air at an effective temperature to produce resin vapors and transferring said vapors from said ladle; the improvement comprising (i) transferring said vapors to an auxiliary burner to affect combustion of said transferred vapors to produce non-toxic gases;

(ii) drawing said transferred vapors to said auxiliary burner under suction by suction means to create a negative pressure differential value of said transferred vapor relative to atmospheric;

(iii) measuring the pressure differential value of said transferred vapors relative to atmospheric;

(iv) feeding said pressure differential value to a central processing means;

(v) controlling by said central processing means said suction means to control the pressure differential value of said vapors at a desired negative value;

(vi) measuring the temperature value of said transferred vapors;

(vii) feeding said temperature value to said central processing means; and (viii) controlling by said central processing means the amount of air to said ladle to maintain said transferred vapors above the condensation temperature of said vapors.

8. Apparatus for the curing of the resin-bonded refractory brick lining of a ladle within a housing, comprising means for heating said brick in air at an effective temperature to produce resin vapors and means for transferring said vapors as transferred vapors from said ladle, the improvement comprising means for maintaining said transferred vapors above the condensation temperature of said vapors, auxiliary burner means for burning said transferred vapors to produce non-toxic gases therefrom; means for transferring said transferred vapors to said auxiliary burner means; and for recovering and maintaining a negative pressure differential within said housing relative to outside of said housing.

9. Apparatus as defined in claim 8 comprising means for maintaining a pressure of less than atmospheric within said housing.

10. Apparatus for the curing of the resin bonded refractory brick lining of a ladle within a housing, comprising means for heating said brick in air at an effective temperature to produce resin vapors and means for transferring said vapors as transferred vapors from said ladle; the improvement comprising (i) an auxiliary burner to affect combustion of said transferred vapors to produce non-toxic gases;

(ii) suction fan means for transferring said transferred gases to said auxiliary burner under a desired negative pressure differential value relative to atmospheric;

(iii) pressure measuring means for determining said pressure differential value;

(iv) temperature measuring means for determining the temperature of said transferred vapors;

(v) air inlet means for providing air to said housing; and (vi) central processing means in communication with said suction means, said air inlet means said temperature measuring means and said pressure measuring means and for controlling said suction means and said air inlet means for maintaining said desired negative pressure differential value and said temperature of said transferred vapors above said condensation temperature of said vapors.

* * * * *